United States Patent [19]
Peyre et al.

[11] Patent Number: 5,811,887
[45] Date of Patent: Sep. 22, 1998

[54] ELECTRICAL ANTITHEFT SYSTEM FOR MOTOR VEHICLE

[75] Inventors: Jean Peyre, Sevres; Olivier Demouy, Vincennes; Arnaud Humbert, Champigny sur Marne, all of France

[73] Assignee: Valeo Securite Habitacle, Creteil, France

[21] Appl. No.: 713,040

[22] Filed: Sep. 12, 1996

[30] Foreign Application Priority Data

Sep. 12, 1995 [FR] France .................................. 95 10743

[51] Int. Cl.⁶ ...................................................... B60R 25/04
[52] U.S. Cl. .......................................... 307/10.3; 180/287
[58] Field of Search .................................. 307/10.1–10.6; 180/287; 70/237, 252, 255–257; 340/429.9, 426, 825.3–825.32, 825.34, 825.69, 825.72; 123/198 B, 198 DC, 179.1

[56] References Cited

U.S. PATENT DOCUMENTS

| | | | |
|---|---|---|---|
| 4,223,927 | 9/1980 | Kobayashi et al. . | |
| 4,553,127 | 11/1985 | Issa | 307/10.3 |
| 4,621,223 | 11/1986 | Murakami et al . | |
| 4,774,443 | 9/1988 | Herzig . | |
| 5,191,228 | 3/1993 | Sloan | 307/10.3 |
| 5,343,077 | 8/1994 | Yoshida et al. | 307/10.3 |
| 5,449,957 | 9/1995 | Carlo | 307/10.3 |
| 5,557,255 | 9/1996 | Adams | 180/287 |

FOREIGN PATENT DOCUMENTS

| | | |
|---|---|---|
| 185 238 | 11/1985 | European Pat. Off. . |
| 646 506 | 9/1994 | European Pat. Off. . |
| 2 710 599 | 11/1995 | France . |
| 40 19478 | 1/1991 | Germany . |

OTHER PUBLICATIONS

Patent Abstracts of Japan, vol. 009, No. 057 (M–363), 13 Mar. 1985 & JP–A–59 192642 (Kokusan Kinzoku Kogyo KK).

Patent Abstracts of Japan, vol. 008, No. 100 (M–295), 11 May 1984 & JP–A–59 014562 (Kokusan Kinzoku Kogyo KK).

*Primary Examiner*—Richard T. Elms
*Attorney, Agent, or Firm*—Morgan & Finnegan, LLP

[57] ABSTRACT

An electrical antitheft system for a motor vehicle inhibits the power supply to the ignition circuit of the vehicle, by preventing the engine from starting so long as the motor that actuates a blocking member of the antitheft system has not reached the unlocked position. The logic functions for controlling locking and unlocking of the system are obtained through a wired and protected logic system that connects the power supply terminals of the motor of the antitheft system to the poles of the battery through a pair of switches.

10 Claims, 13 Drawing Sheets

# ELECTRICAL ANTITHEFT SYSTEM FOR MOTOR VEHICLE

FIELD OF THE INVENTION

The present invention relates to an electrical antitheft system, especially for a motor vehicle, and the like.

BACKGROUND OF THE INVENTION

It has previously been proposed to provide systems which enable openable elements of an artifact, and in particular the doors of a motor vehicle, to be locked by remote control and therefore without any electrical or mechanical contact. In particular, keyless access techniques have been developed which enable access to be obtained without any need to take out a mechanical key or equivalent device for obtaining access. Such a system is very attractive from the point of view of the convenience which it gives the user. In addition, systems of this kind raise various possibilities for gaining access using aspects of information technology.

In the application of such systems to the locking and unlocking of opening elements such as those of a motor vehicle, or for the locking and unlocking of a security device, such as a steering column lock or a lock for the output shaft of the gearbox of a vehicle, various mechanical systems have been proposed in this context. Such systems make use of motorised components of various electrical types, such as a rotating electric motor or an electromagnet.

When the system for gaining access recognises that a right of access exists, together with a demand for access, a control member produces a command for actuation which excites the electric motor means. The antitheft system, and/or the lock, then changes state by passing from the locked state to the unlocked state. A similar sequence takes place in the reverse direction on access and/or on activation, or arming, of the antitheft system.

In one known type of design, which is described and shown in French published patent specification FR 2 710 599A, a method for the control of a motor vehicle antitheft system was produced, in particular with a remote control access system, which, in particular, made use of the control switch that is provided for the purpose of controlling starting of the engine of the vehicle, and for control of the electrical power supply to the accessories of the vehicle and the ignition circuit of the engine. In that method, in a disarming phase of the antitheft system, the vehicle is addressed, for example with a radio frequency remote control unit; a switch is operated which reproduces by simulation the manipulation of conventional mechanical keys; a predetermined position of the switch is detected so as to produce an interrogation signal for identification of the demand for disarming the antitheft unit; and, on receipt of a satisfactory response, an order is given for the operation of the switch through successive positions, and an order to unlock the antitheft unit.

In an activation or arming phase of the antitheft unit, a maneuver for arming the antitheft unit is detected on the switch, this maneuver reproducing the usual manipulations of mechanical keys, and the antitheft system is then activated and the successive positions of the switch are deactivated.

In order that such a method can be operated, use is made of an antitheft system of the type comprising:

an antitheft switch for controlling starting of the engine of the vehicle and for supplying power to the various electric circuits of the vehicle; and a motorized antitheft device which comprises an electric motor, for driving a blocking member between a locked position and an unlocked position by inversion of the polarities of the power supply terminals of the motor, for example via an electrical power pack for the motor, the system being also of the type in which the antitheft switch comprises:

a key interrupter for detecting simulation of the introduction of a key into the antitheft switch; and a multiple position control interrupter for controlling, in sequence, the power supply of a plurality of electrical circuits of the vehicle and of the starter for the engine, the multiple position control interrupter comprising a movable control contact connected to one polarity of a source of electrical power, together with a set of fixed contacts with which the movable control contact enters into successive contact during operation of the switch, so as to cause the vehicle to start.

In the design described and shown in the above mentioned French patent specification, the antitheft system also includes a central control unit connected to the various elements of the system mentioned above so as to perform a method for controlling the antitheft system. The central control unit includes, in particular, a microprocessor which generates the process for controlling the antitheft system.

DISCUSSION OF THE INVENTION

An object of the present invention is to propose a new design for an electrical antitheft system of the type defined above, which provides all the desired functions with the required degree of reliability, but without it being necessary to make use of an antitheft system central control unit in the form of a microprocessor. In other words, the invention aims to provide a design in which the logic means for controlling locking and unlocking of the antitheft system is made in the form of a wired and protected logic unit.

To this end, according to the invention, an electrical antitheft system for a motor vehicle, of the type comprising:

an antitheft switch for controlling starting of the engine of the vehicle and for controlling the supply of power to different electric circuits of the vehicle; and a motorized antitheft means comprising an electric motor for driving a blocking member between a locked position and an unlocked position by inversion of the polarities at the power supply terminals of the motor, and being further of the type in which the anti-theft switch includes:

a key interrupter for detecting simulation of the introduction of a key into the antitheft switch; and a multiple position control interrupter for controlling a sequential supply of power to a plurality of electrical circuits of the vehicle and to the starter, and comprising a movable control contact connected to one polarity of an electrical power supply source, together with a set of fixed contacts with which the movable control contact enters into successive contact during actuation of the antitheft switch, with a view to causing the vehicle to start, is characterised in that the electric motor of the motorized antitheft system includes:

a first power supply terminal which is connected to a first polarity of the power supply source via the key interrupter and in the absence of a key, or which is connected to the second polarity of the power supply source through the key interruptor in the presence of a key, and via means for detecting the state of the antitheft system when the antitheft system is not in its unlocked state;

and a second power supply terminal which is connected to the first polarity of the power supply source via a key interruptor and in the presence of a key, or in the absence of a key and via the means for detecting the state of the antitheft system when the antitheft system is in its locked state, or which is connected to the second polarity of the power supply source via the key interrupter in the absence of a key, and via the means for detecting the state of the antitheft system when the latter is not in its locked state.

According to a preferred feature of the invention, the key interrupter includes a pair of movable contacts which are mounted for simultaneous movement between a first position, corresponding to the absence of a key, and a second position corresponding to the presence of a key, the movable contacts comprising a first and a second movable contact, wherein:

the first movable contact is connected to the first power supply terminal of the motor and is adapted to cooperate, in the absence of a key, with a fixed contact permanently connected to the first polarity of the power supply source, and, in the presence of a key, is adapted to cooperate with a first output terminal of the means for detecting the state of the antitheft system, which is connected to the second polarity of the power supply source when the antitheft system is not in its unlocked state;

and the second movable contact is connected to the second power supply terminal of the motor and is adapted to cooperate, in the presence of a key, with a fixed contact permanently connected to the first polarity of the power supply source, and, in the absence of a key, is adapted to cooperate with a second output terminal of the means for detecting the state of the antitheft system, which is connected to the second polarity of the power supply source when the antitheft system is not in its locked state.

With this latter arrangement, and according to another preferred feature of the invention, the detecting means for detecting the state of the antitheft system comprise:

an interrupter for detecting unlocking of the antitheft system and comprising a movable contact connected to the first output terminal, being arranged to cooperate with a first fixed contact connected to the second polarity of the power supply source when the antitheft system is not in its unlocked state, and being further arranged to cooperate with a fixed contact connected to the second power supply terminal of the motor when the antitheft system is in its unlocked state;

and a further interrupter, for detection of the unlocked state of the antitheft system, and including a movable contact connected to the second output terminal and arranged to cooperate with a first fixed contact connected to the second polarity of the power supply source when the antitheft system is not in its locked state, being further arranged to cooperate with a second fixed contact connected to the first power supply terminal of the motor when the antitheft system is in its locked state.

The said first fixed contacts of the interrupters for detecting the locked and unlocked states of the antitheft system are then preferably in the form of conductive contact strips, the associated movable contacts of the means for detecting the state of the antitheft system being coupled in rotation to the output shaft of the motor of the antitheft system.

According to a further preferred feature of the invention, at least one of the fixed contacts of the multiple position control interrupter of the antitheft switch is connected to the associated electrical circuit of the vehicle through an inhibiting device which establishes the electrical power supply to that circuit only when the antitheft system is in its unlocked state.

According to a further preferred feature of the invention, the inhibiting device consists of an inhibiting switch, a movable contact of which is connected to the fixed contact of the control interrupter and cooperates with a fixed contact connected to the electrical circuit of the vehicle when the antitheft system is in its unlocked state.

According to yet another preferred feature of the invention, the movable control contact of the multiple position control interrupter of the antitheft switch is connected to one polarity of the power supply source through an inhibiting device which makes the electrical connection only when the antitheft system is in its unlocked state.

The inhibiting device is then preferably an inhibiting interrupter, the movable contact of which is connected to one polarity of the power supply source and cooperates with a fixed contact connected to the movable control contact when the antitheft system is in its unlocked state.

The movable contact of the inhibiting interrupter is preferably coupled to the motor for rotation therewith.

The antitheft switch is preferably in the form of a rotary switch.

Further features and advantages of the invention will appear more clearly on a reading of the detailed description of preferred embodiments of the invention which is given below, by way of example only and with reference to the accompanying drawings.

DESCRIPTION OF PREFERRED EMBODIMENTS OF THE INVENTION

Figure 1:
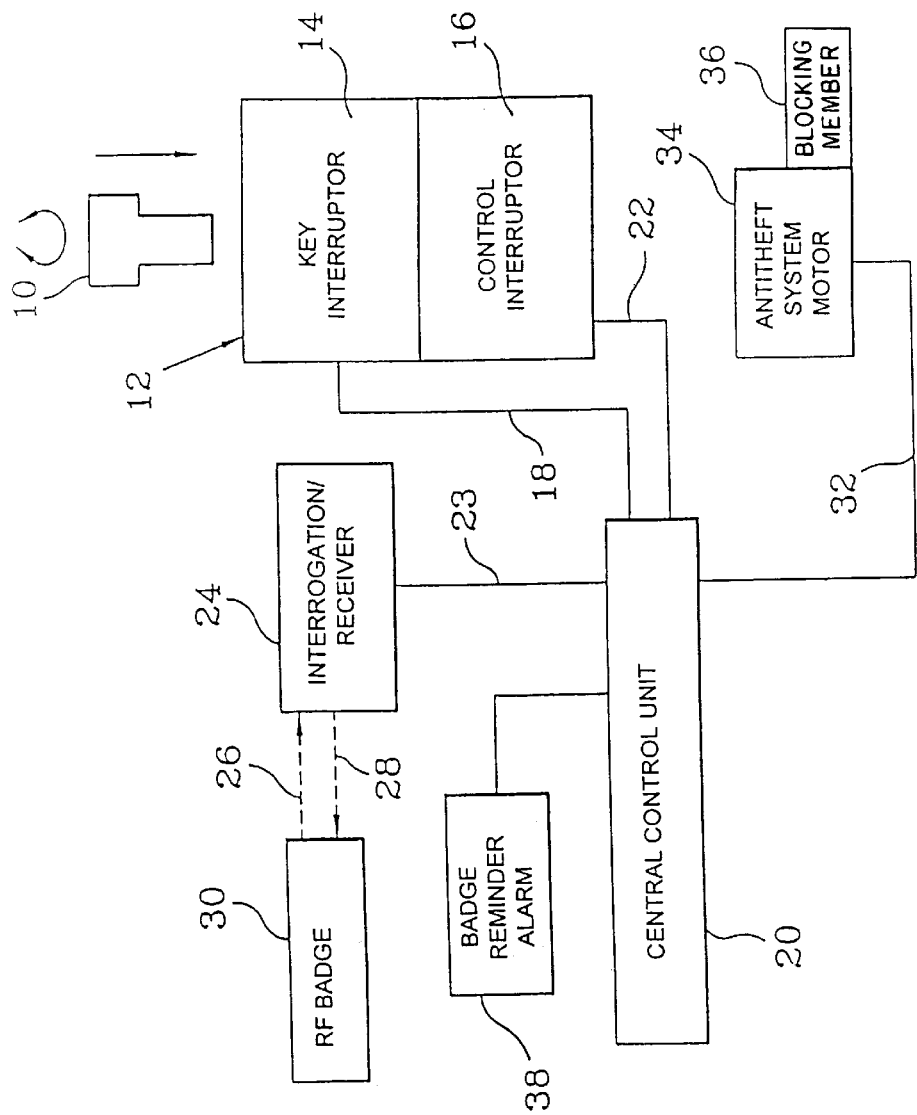
FIG. 1 is a block diagram illustrating a form of antitheft system in the current state of the art, which includes, in particular, an antitheft system central control unit.

Reference is first made to FIG. 1, in which the antitheft system in accordance with the current state of the art comprises a key 10, or a false key, which is adapted to be introduced into the lock, or a false lock, of an antitheft switch 12. This switch is arranged to be mounted on the fascia of the vehicle, and its design is of a type substantially similar to that of the ignition/starter switch of a vehicle of conventional form. The contact key 10 is of course arranged to be operated by the user of the vehicle.

In practice, the contact key 10 is a false key, in the sense that it does not necessarily act on a mechanical lock, although an actual key associated with a mechanical lock does give an additional degree of security by adding a locking and unlocking means to the general design of the electrical antitheft system.

The antitheft switch 12 includes a key interrupter 14 which is arranged to detect the absence of the key 10, or the presence of the key when the latter is introduced into the lock of the switch 12. The switch 12 also comprises a multiple position control interrupter 16, for controlling starting of the engine of the vehicle and for controlling the power supply to the various electrical circuits of the vehicle, and in particular the ignition circuit of the engine.

The key interrupter 14 is connected through a line 18 to an input of a central control unit 20 of the antitheft system, while the control interrupter 16 is connected through a line 22 to another input of the central control unit 20.

The antitheft system central control unit 20 includes an analysis circuit which is, in particular, capable of reading the positions occupied by the key interrupter 14 and control interrupter 16 of the antitheft switch 12. For example, in the current state of the art the central control unit 20 may include a microcontroller such as an INTEL 8051 circuit. This circuit contains a program for reading the input ports, so as to inform the central control unit of the positions occupied by the various interrupters of the antitheft switch 12.

In one known design, and through a further input and a line 23, the central control unit 20 is able to exchange signals with an interrogating and receiving station 24, which exchanges signals, through further lines 26 and 28, with, for example, a radio frequency badge 30 for giving keyless access to the vehicle. According to the exchanges of signals with the central control unit 20, the latter produces over a line 32 a control signal commanding the starting, in either direction, of an antitheft system motor 34, which acts on a suitable blocking member 36 that prevents rotation of the steering column of the vehicle or the output shaft of the gearbox.

In addition, if the user forgets or mislays the radio frequency badge 30 when in the vehicle, or if he omits to operate the key 10 so as to set in train a sequence of activation of the antitheft system at the same time as leaving his badge in the vehicle, the central control unit 20 causes a badge reminder alarm 38 to be activated.

Figure 2:
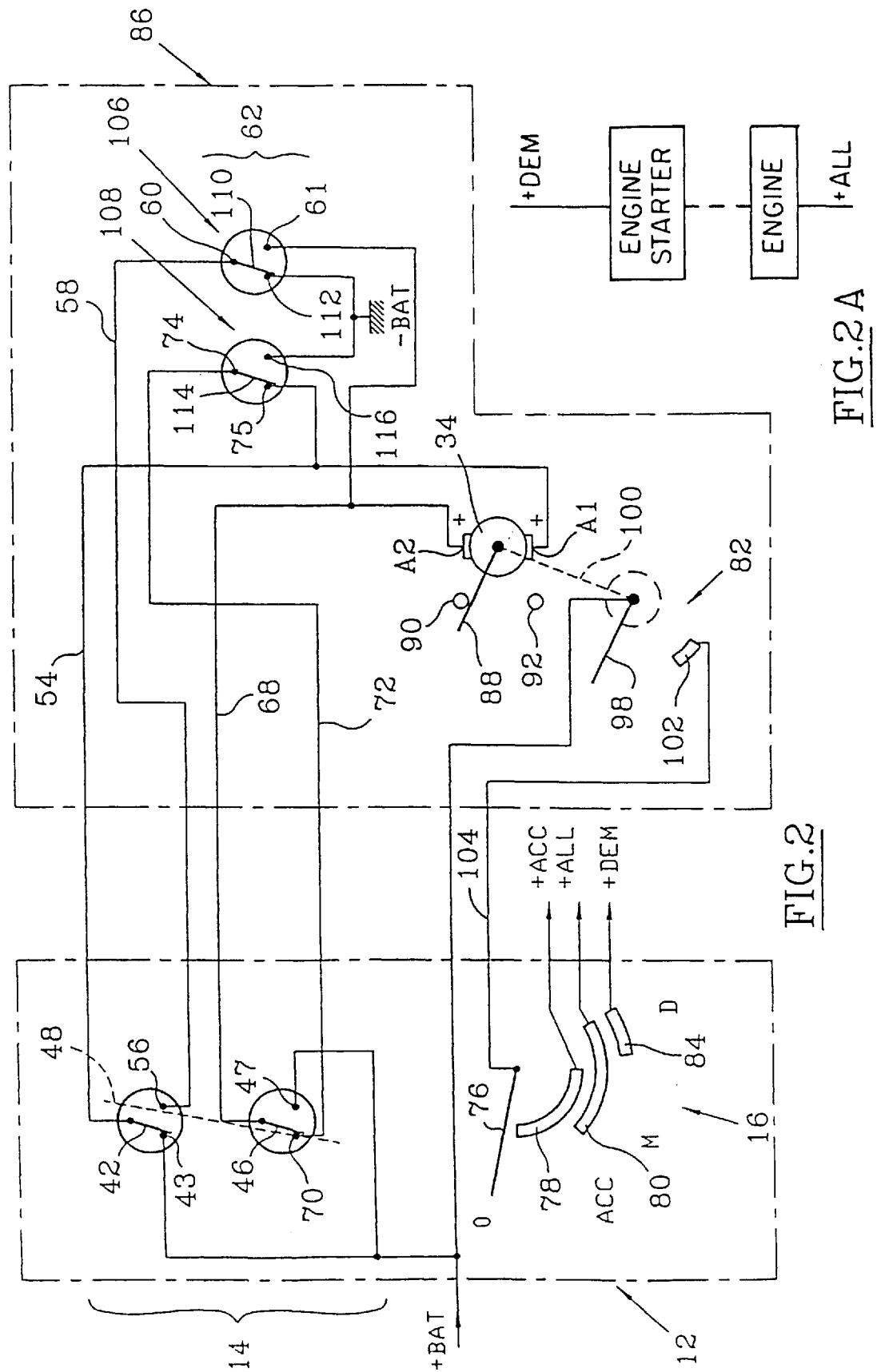
FIG. 2 is a block diagram of a first embodiment of an antitheft system in accordance with the present invention, in which the electrical antitheft system is shown in its locked state.

A first embodiment of an electrical antitheft system in accordance with the invention will now be described with reference to FIGS. 2 to 7. Referring first to FIG. 2, those components which are identical or similar to those already mentioned in connection with FIG. 1 are here designated by the same reference numerals.

In FIG. 2, the means for controlling switching of the motorized electrical antitheft system take the form of a wired and protected logic circuit, and does not call for the use of a central control unit as in the prior art arrangements. To this end, the key interrupter 14 consists of two switches, each of which comprises a movable contact 42 or 46. These switches are ganged mechanically together through a link which is shown diagrammatically by the broken line 48, so that they are both moved simultaneously between a first position shown in FIG. 2, which corresponds to the absence of a key in the key interrupter 14, and a second position that corresponds to the presence of a key in the key interrupter 14. This second position is shown for example in FIG. 3.

The movable contact 42 of the first of these switches is permanently connected to a first electrical power supply terminal A1 of the motor 34 of the system. In the absence of a key, the movable contact 42 cooperates with a first fixed contact 43 of the first switch, which is permanently connected to a first polarity +BAT of the battery of the vehicle. The first fixed contact 43 is also permanently connected to a fixed contact 47 of the second switch of the key interrupter 14.

Figure 3:
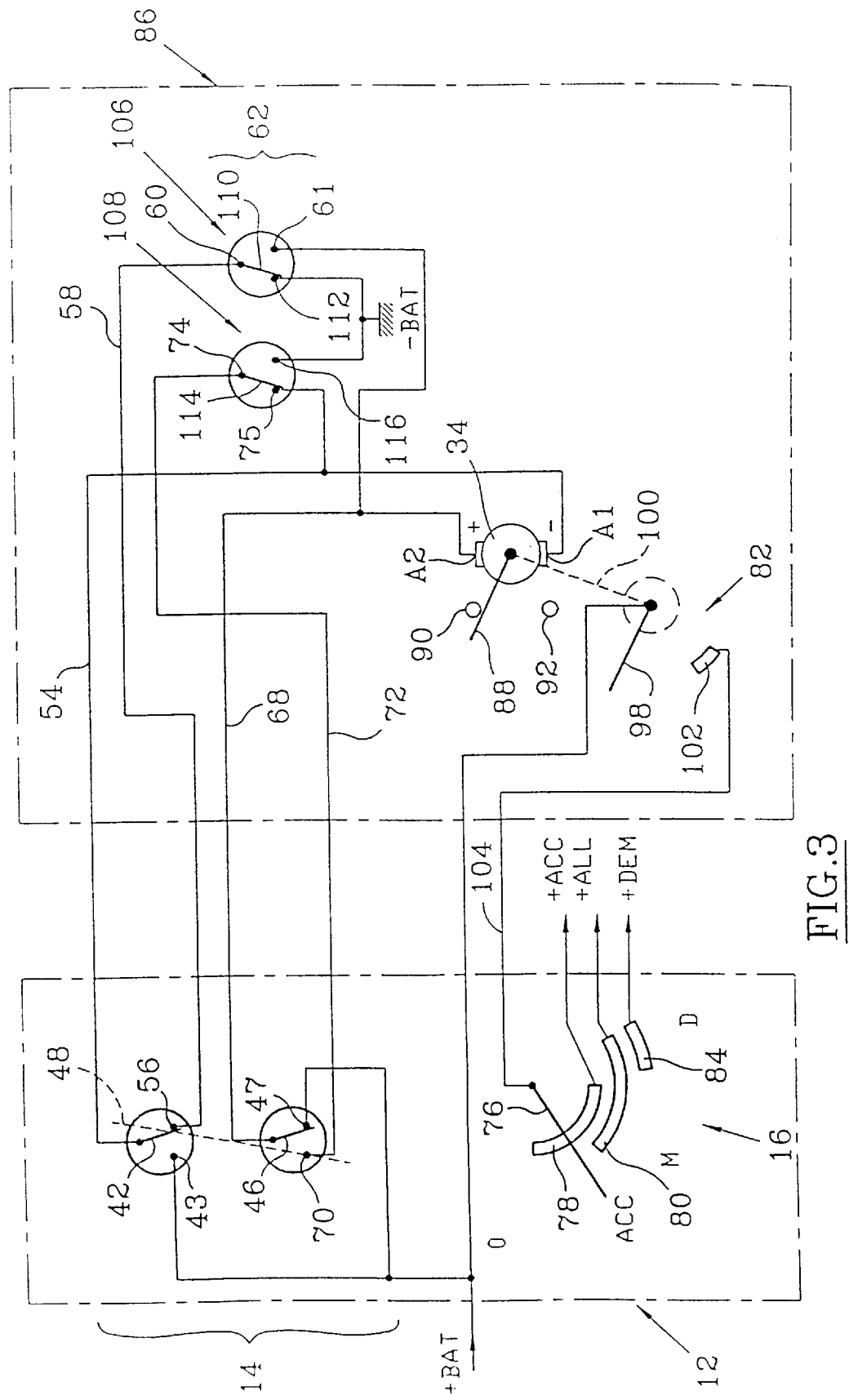
FIG. 3 is a diagram similar to FIG. 2 in which the electrical antitheft system is again in its locked state, but after the introduction of a key has been simulated.

When a key is present in the key interrupter 14, and as is in particular shown in FIG. 3, the first movable contact 42 cooperates with a second fixed contact 56 of the first switch. This fixed contact 56 is permanently connected through a line 58 to a first fixed output terminal 60 of a detecting means 62 for detecting the state of the antitheft system.

The movable contact 46 of the second key interrupter switch is permanently connected to a second electrical power supply terminal A2 of the motor 34. In the absence of a key, and as can be seen in FIG. 2, the movable contact 46 of the second key interrupter switch cooperates with a first fixed contact 70 of the latter. This first fixed contact 70 is connected permanently, through a line 72, to a second fixed output terminal 74 of the system state detecting means 62.

When a key is present, on the other hand, and as is shown in particular in FIG. 3, the movable contact 46 cooperates with the second fixed contact 47 of the second key interrupter switch which, like the first fixed contact 43 of the other key interrupter switch, is permanently connected to the +BAT terminal of the battery.

Thus, the fixed switch contacts 43 and 47, engaged by the moving contact 42 in the absence of a key, and the moving contact 46 in the presence of a key, respectively, are both connected together electrically.

In this first embodiment, i.e. that shown in FIGS. 2 to 7, the multiple position control interrupter 16 is of the rotary type, comprising a movable control contact 76 which is connected to the +BAT terminal of the battery of the vehicle through an inhibiting device 82. The movable control contact 76 is arranged to occupy in succession a plurality of positions which are offset in rotation from each other. These consist, respectively, of a stop position 0, an electrical accessory power supply position ACC, a running position M, and a starting position D. The rotary control contact 76 is arranged to cooperate with one or more of a set of conductive contact strips, which are arranged on an arc of a circle and which constitute the fixed contacts of the multiple position control interruptor 16.

When the movable contact 76 is in its stop position 0, as in FIG. 2, it is not in cooperation with any of these fixed contacts. When the contact 76 is moved into the accessory power supply position ACC, it cooperates with a fixed contact strip 78 which is connected electrically to the circuit +ACC for supplying power to the various accessories of the vehicle. In its running position M, the movable control contact 76 is in contact with both the fixed contact strip 78 and a further fixed contact strip 80, which is connected electrically to the ignition circuit +ALL for the engine of the vehicle.

Finally, when the movable control contact 76 is in the starting position D, it is in contact with the fixed contact strip 80 and with a contact strip 84, which is connected to the starter circuit +DEM for supplying power to the starter of the internal combustion engine of the vehicle.

Introduction of a control key into the antitheft switch 12, or any other action which simulates the introduction of such a key, has the effect of, firstly, causing the key interrupter 14 to change its state. Under the control of the driver it then causes the movable control contact 76 of the multiple position control interrupter 16 to change its position.

FIG. 2 shows a block 86, indicated in phantom lines, which represents a blocking module. This blocking module 86 will now be described in greater detail. It includes the motorized antitheft device with its motor 34, the detecting means 62 for detecting whether the system is in its locked or unlocked state, and the inhibiting device 82.

The motor 34 is of the type which is reversible by inversion of the polarities of the power supply at its supply terminals A1 and A2. The output shaft of the motor 34 is thus able to rotate in either direction between a locked state and an unlocked state of the antitheft system. Coupled in rotation to the output shaft of the motor 34 is a movable element 88, indicated diagrammatically in FIG. 2. This element 88 is arranged to cooperate selectively with two mechanical stop elements 90 and 92. These stop elements correspond to the locked state and the unlocked state of the system, respectively.

In this first embodiment shown in FIGS. 2 to 7, the system state detecting means 62 comprise an interrupter 106 and an interrupter 108. The interrupter 106 is associated with detection of the unlocked state of the system, and the interrupter 108 with the detection of the locked state of the system.

The unlocked state detection interrupter 106 has a movable contact 110 which is connected to the first fixed output terminal 60. When the antitheft system is not in its unlocked state, this movable contact 110 cooperates with a fixed contact 112 of the interrupter 106, which is connected to the second pole −BAT of the battery of the vehicle. When the system is in its unlocked state, the movable contact 110 cooperates with a fixed contact 61 which is permanently connected electrically to the movable switch contact 46 of the second switch of the key interrupter 14, and to the second power supply terminal A2 of the electric motor 34.

The locked state detection interrupter 108 has a movable contact 114 which is connected to the second fixed output terminal 74. When the antitheft system is not in its locked state shown in FIG. 2, the movable contact 114 cooperates with a fixed contact 116 of the interrupter 108, which is again connected permanently to the polarity −BAT.

The inhibiting device 82 consists of a rotary switch which has a movable contact 98 connected in rotation to the output shaft of the motor 34, through a mechanical coupling which is indicated diagrammatically by a broken line 100. The movable contact 98 of the inhibiting switch is arranged to cooperate with a fixed contact pad 102 in the form of a conductive strip, but only when the antitheft system is in its unlocked state. The fixed contact pad 102 is connected to the movable control contact 76 of the control interruptor 16, through a line 104, so that the movable control contact 76 is thereby only connected to the first polarity +BAT when the antitheft system is in its unlocked state. From the operating point of view, the inhibiting device 82 is therefore connected upstream of the multiple position control interrupter 16.

The operation of the electrical antitheft system shown in FIGS. 2 to 7 will now be described. When the system is in its locked state as shown in FIG. 2, the movable contact 114 cooperates with a fixed contact 75 of the locked state detection interrupter 108. This contact 75 is permanently connected electrically to the first moving contact 42 of the key interrupter 14, and also to the first power supply terminal A1 of the electric motor 34.

In FIG. 2, with the system in its locked state and in the absence of a key, the first power supply terminal A1 of the motor 34 is connected through a line 54 to the +BAT polarity of the battery of the vehicle, via the first movable contact 42 and fixed contact 43 of the key interrupter 14. The second power supply terminal A2 of the motor is also connected to the battery polarity +BAT, in this case through a line 68 and via the second movable contact 46 and fixed contact 70 of the key interrupter 14, the locked state detection interrupter 108, the line 54 and the key interruptor 14. The motor 34 is therefore at rest, in a short circuit condition. In addition, the movable control contact 76 is not connected to the +BAT polarity.

When the driver introduces a key, the system goes to the condition shown in FIG. 3, since the introduction of the key causes the key interrupter 14 to change its state. The effect of this is to connect the first power supply terminal A1 of the motor 34 to the −BAT polarity of the battery, via the first movable contact 42 of the key interrupter 14. This movable contact 42 connects the terminal A1, via the contact 56 and the line 58, to the movable contact 110 of the unlocked state detection interrupter 106, which is cooperating with the fixed contact 112 connected to the second polarity −BAT. Power is thus supplied to the motor 34 from the battery, and the motor begins to rotate in the anticlockwise direction with reference to FIG. 3.

Figure 4:
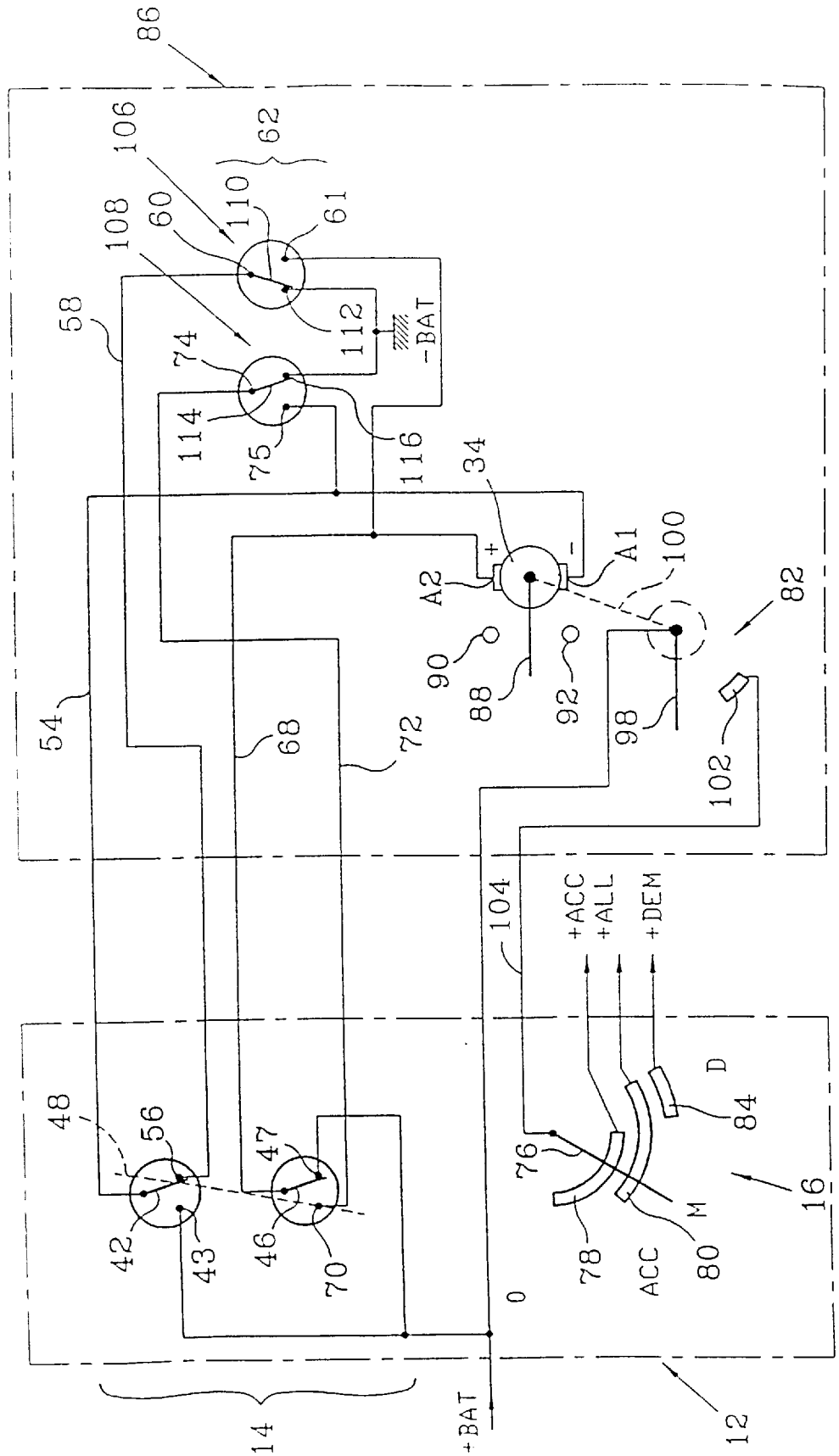
FIG. 4 is a diagram similar to FIG. 3, in which the electrical antitheft system is in course of passing from the locked state to the unlocked state.
Figure 5:
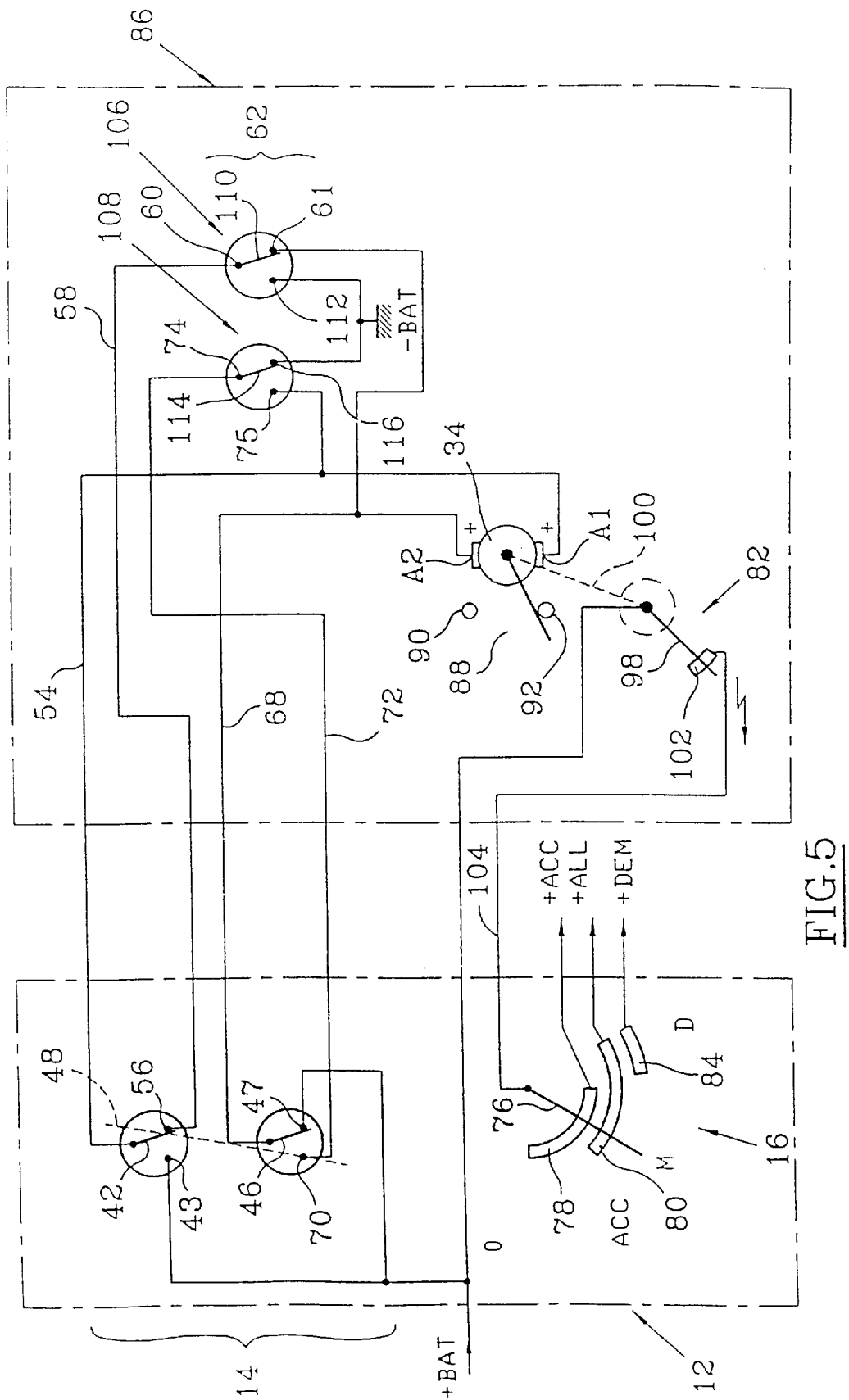
FIG. 5 is a diagram similar to FIG. 4, in which the electrical antitheft system is shown in the unlocked state.

In the intermediate position between the locked state and the unlocked state, which is shown in FIG. 4, the locked state detection interrupter 108 has changed state, so that its movable contact 114 is now in cooperation with its fixed contact 116. Connection of the movable control contact 76 of the control interruptor 16 to the battery is however still inhibited by the inhibiting device 82, and the motor 34 continues to rotate towards the unlocked state of the antitheft system. When this unlocked state is reached, the situation is as shown in FIG. 5, in which the unlocked state detection interrupter 106 changes its state, so that its movable contact 110 is no longer in contact with its fixed contact 112.

In this unlocked state, the first power supply terminal A1 of the motor 34 is connected to the +BAT polarity of the battery of the vehicle via the first movable contact 42 of the key interrupter 14, the movable contact 110 of the locked state detection interrupter 106, and the second movable contact 46 of the key interrupter 14. Thus, the two power supply terminals A1 and A2 of the motor 34 are connected to the same polarity +BAT of the battery of the vehicle, and the motor therefore stops in a short circuit condition.

Simultaneously, the movable contact 98 of the inhibiting device 82 is in contact with the fixed contact pad 102, so that the movable contact 76 of the control interrupter 16 is connected to the +BAT polarity of the battery of the vehicle, thereby enabling the various electrical circuits of the vehicle to be connected to the +BAT polarity according to the angular position occupied by the movable control contact 76 of the multiple position control interrupter 16.

Figure 6:
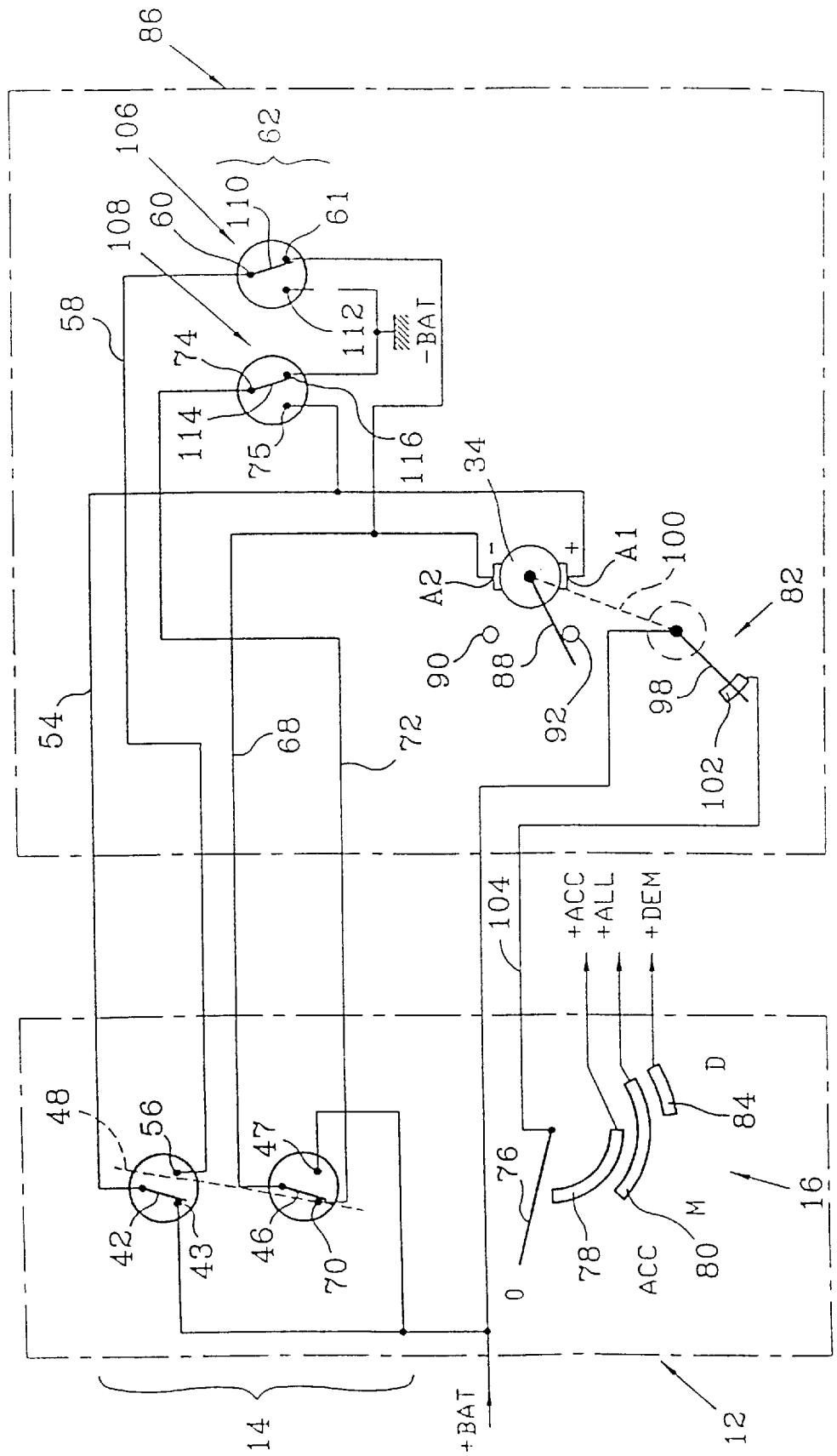
FIG. 6 is a diagram similar to FIG. 5, in which the electrical antitheft system is again shown in its unlocked state, but after the withdrawal of a key has been simulated.

When the driver once again desires to lock the antitheft system, he withdraws the key from the key interrupter 14, and this causes the two movable contacts 42 and 46 of the latter to change state simultaneously. The situation is now as shown in FIG. 6, in which the first power supply terminal A1 of the motor 34 is connected to the +BAT polarity of the battery of the vehicle via the first movable contact 42 of the key interruptor 14, while the second power supply terminal A2 of the motor 34 is connected to the −BAT polarity through the second movable contact 46 of the key interrupter 14 and the locked state detection interrupter 108. The motor 34 is thus supplied with power, and it begins to turn in a clockwise direction with reference to FIG. 6, so as to leave its unlocking position, and rotates towards its locking position shown in FIG. 2.

Figure 7:
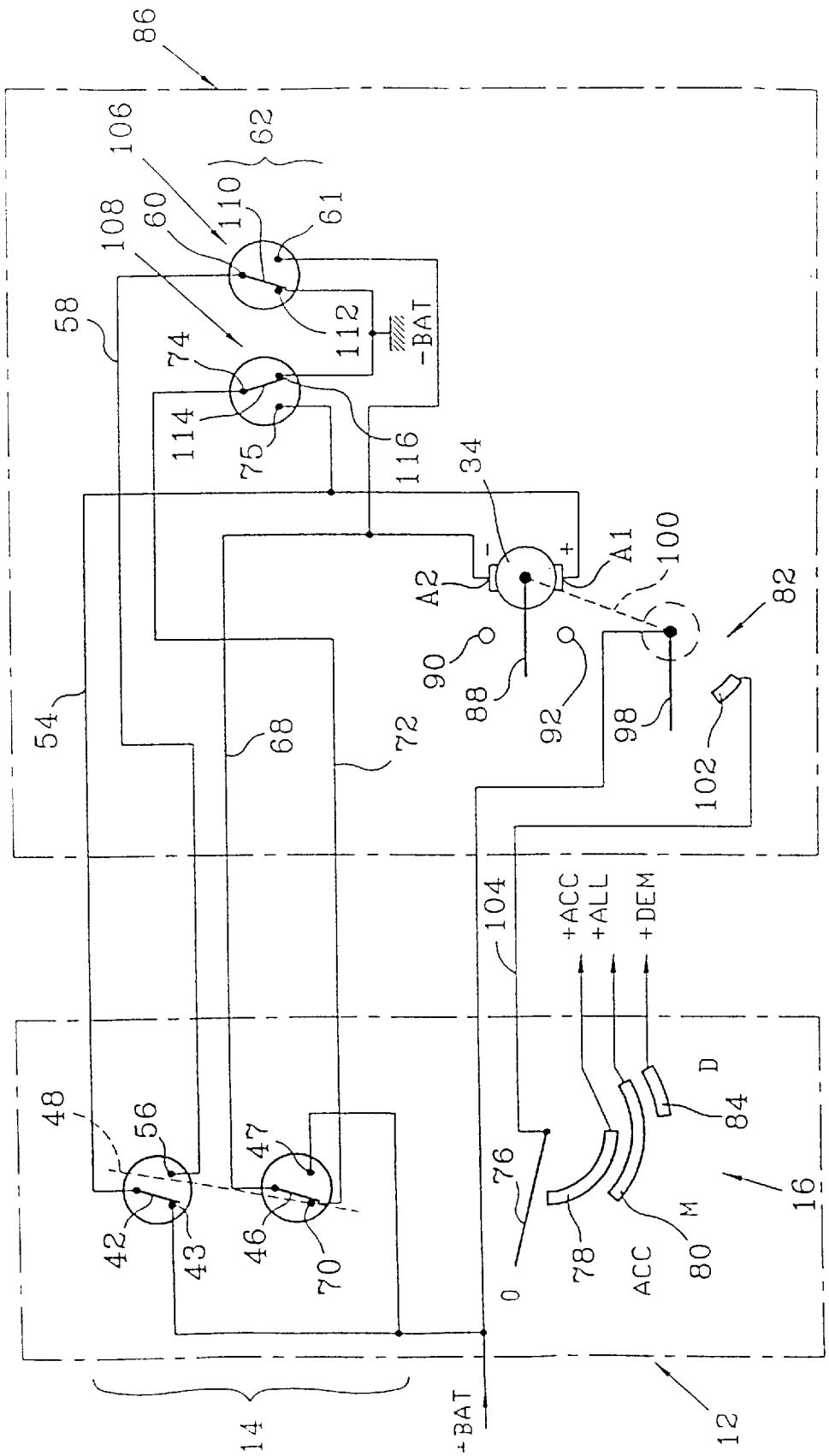
FIG. 7 is a diagram similar to FIG. 6, in which the antitheft system is in course of passing from the unlocked state to the locked state.

Once the motor 34 leaves its unlocking position, the circuit is in the state shown in FIG. 7. Here it can be seen that the inhibiting device 82 immediately interrupts the electrical connection between the movable control contact 76 and the +BAT polarity of the battery. The beginning of this rotation of the motor also causes the unlocked state detection interrupter 106 to change its state immediately.

Rotation of the motor 34 is continued in the clockwise direction until it once again reaches its locking position shown in FIG. 2. The stopping of its rotation causes a new change of state to occur in the locked state detection interrupter 108, such that its movable contact 114 leaves the fixed contact 116 so as to occupy its rest position shown in FIG. 2, in which it is in cooperation with the fixed contact 75.

Figure 8:
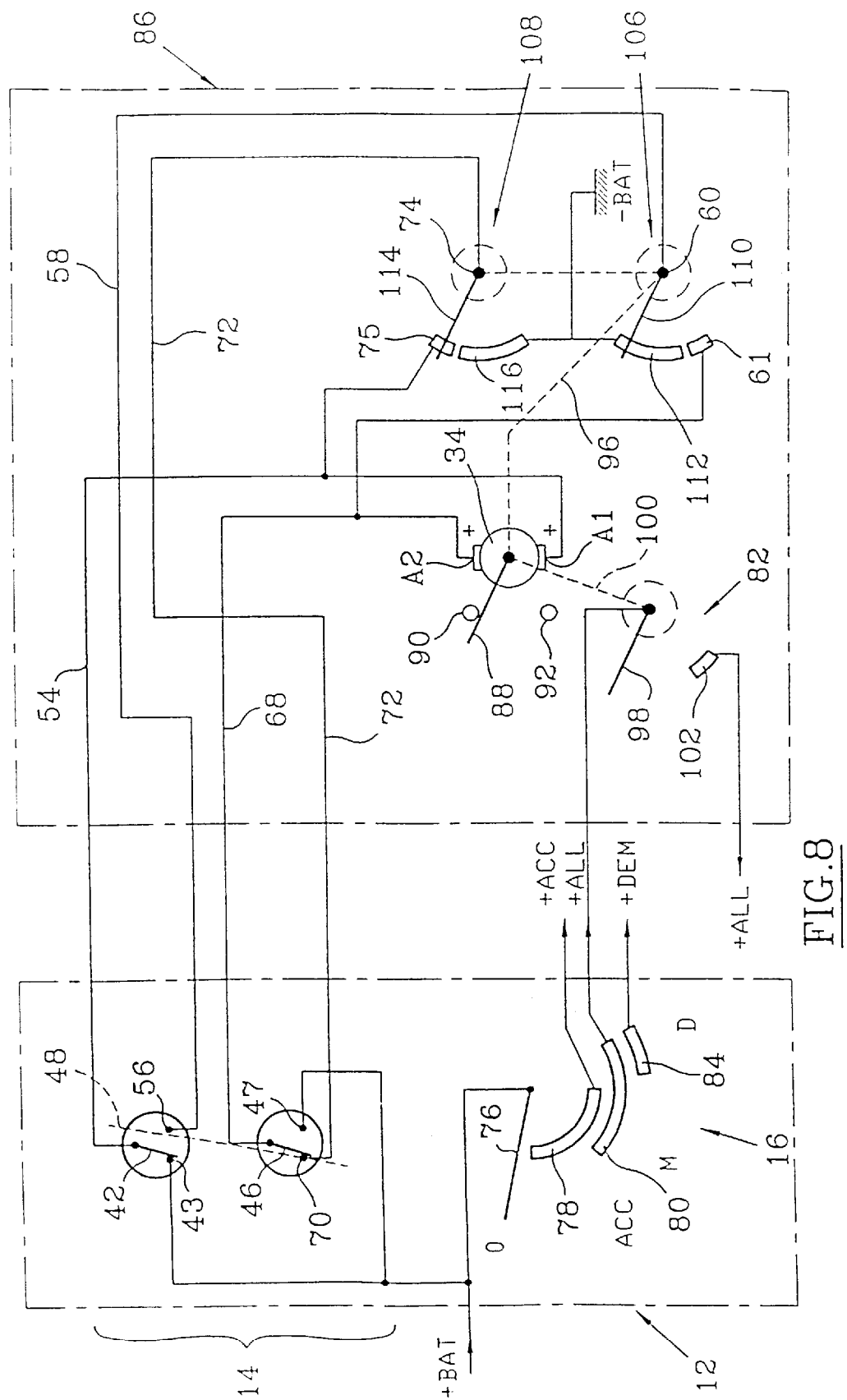
FIG. 8 is a block diagram showing a second embodiment of an electrical antitheft system in accordance with the invention, with the system being shown in the locked state.
Figure 9:
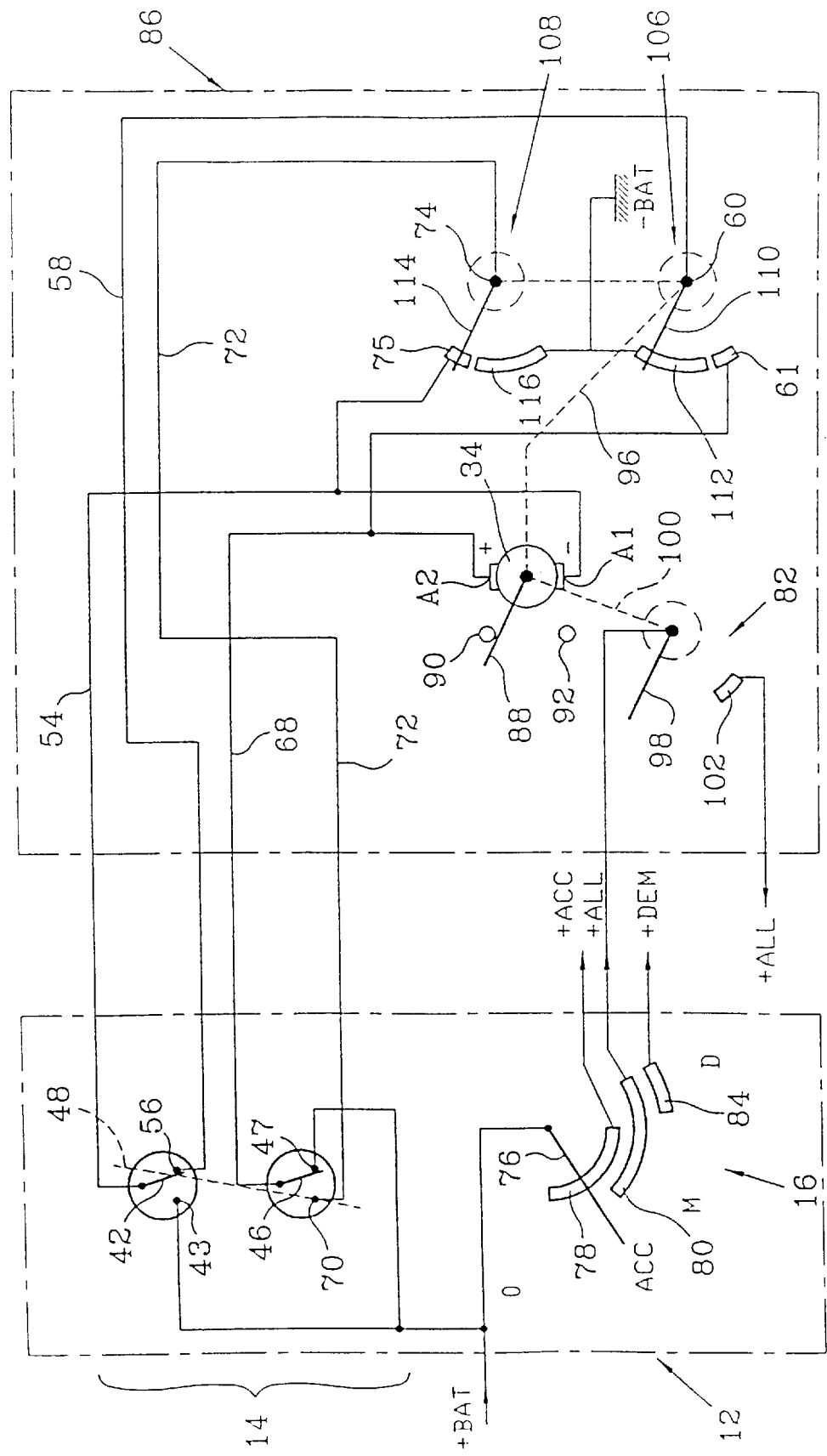
FIG. 9 is a diagram similar to FIG. 8, in which the system is still in the locked state, but after the introduction of a key has been simulated.
Figure 10:
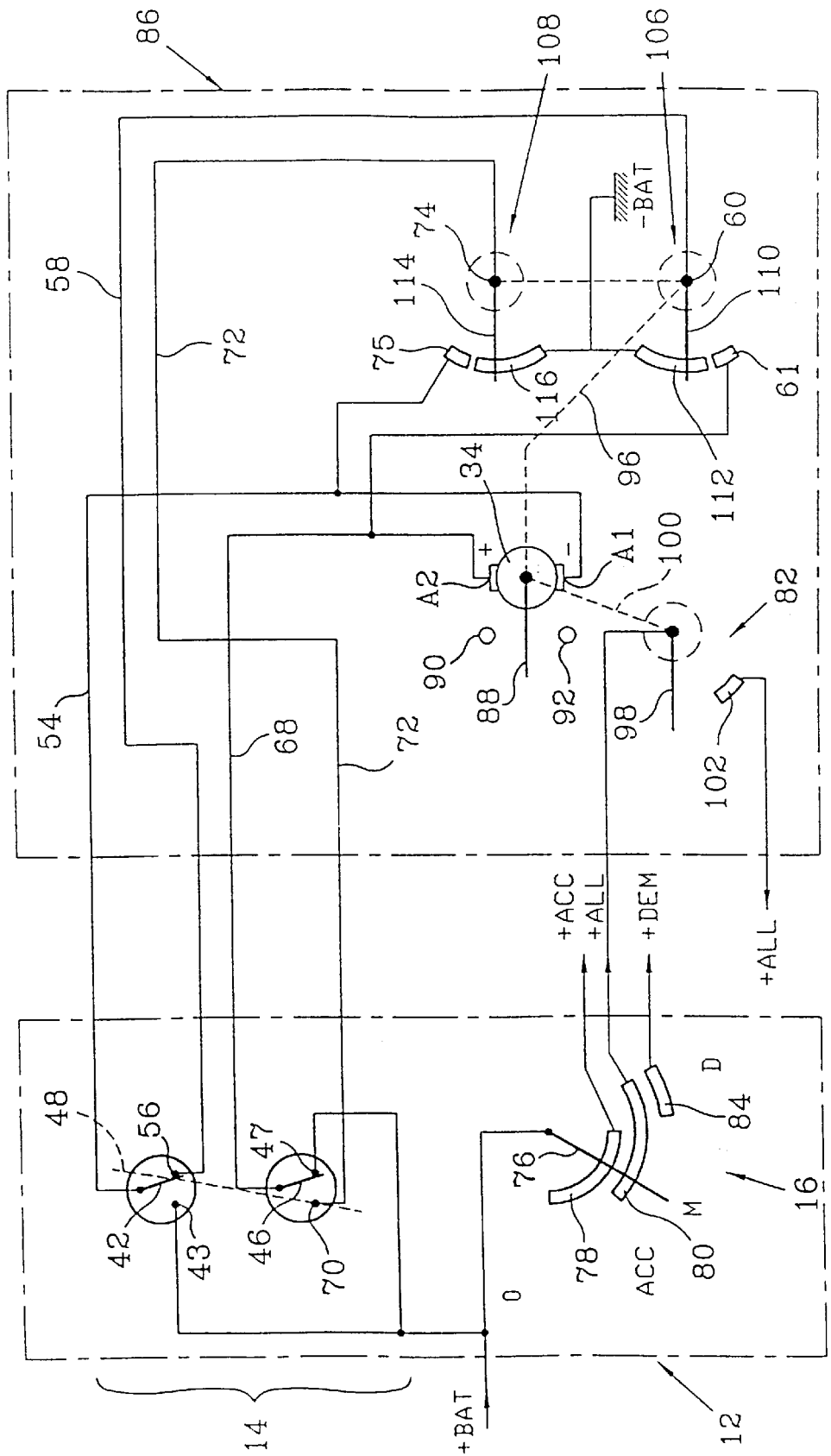
FIG. 10 is a diagram similar to FIG. 9, in which the electrical antitheft system is in course of passing from the locked state to the unlocked state.

Reference is now made to FIGS. 8 to 13 showing a second embodiment of the electrical antitheft system in accordance with the invention. In FIGS. 8 to 1 3, those components which are identical or similar to those in FIGS. 2 to 7 are indicated by the same reference numerals.

As can be seen from the left hand half of FIGS. 8 to 1 3, the multiple position control interrupter 16 is of a design which is slightly different from that described above with reference to FIGS. 2 to 7, in that the movable control contact 76 is permanently connected to the +BAT polarity of the battery of the vehicle. Also in this second embodiment, it is the fixed contact strip 80 for the ignition circuit +ALL of the engine of the vehicle that is connected to the inhibiting device 82. The inhibiting device 82 is therefore connected electrically downstream of the multiple position control switch 16 in this embodiment.

The fixed contact pad 102 of the inhibiting device 82 is connected to the ignition circuit +ALL of the vehicle, so that the ignition circuit is therefore connected to the first polarity +BAT only when the antitheft system is in its unlocked state, this connection being provided via the movable control contact 76, the fixed contact strip 80, the movable contact 98 of the inhibiting device 82, and the fixed contact pad 102 of the latter.

In FIGS. 8 to 13, the system state detecting means 62 is generally similar to that described and shown with reference to FIGS. 2 to 7. However, the fixed pads or contacts 75, 116 and 61, 112 are here in the form of electrically conductive contact strips which are arranged in pairs on an arc of a circle as extensions of each other. Each of the movable contacts 110 and 114 of the unlocked state detection interrupter 106 and the locked state detection interrupter 108, respectively, are rotary movable contacts, which are both coupled for simultaneous rotation with the shaft of the motor 34 by means of a mechanical coupling indicated diagrammatically by the broken line 96 in FIGS. 8 to 13.

Operation of this second embodiment is in every way equivalent to that already described with reference to the first embodiment shown in FIGS. 2 to 7. In particular, the operation of the locked state and unlocked state detection interrupters 106 and 108 is perfectly identical. It is only the presence of the inhibiting device 82 downstream of the multiple position rotary switch 16 that gives rise to differences in the way the system works in response to operation of this switch by the driver. In this connection, when the motor 34 is in the process of causing the antitheft system to change state from its locked to its unlocked condition, the driver can simultaneously rotate the movable control contact 76 of the control interrupter 16 so as to put it into contact with the conductive strip 78, so supplying power to the electrical accessories of the vehicle.

Figure 11:
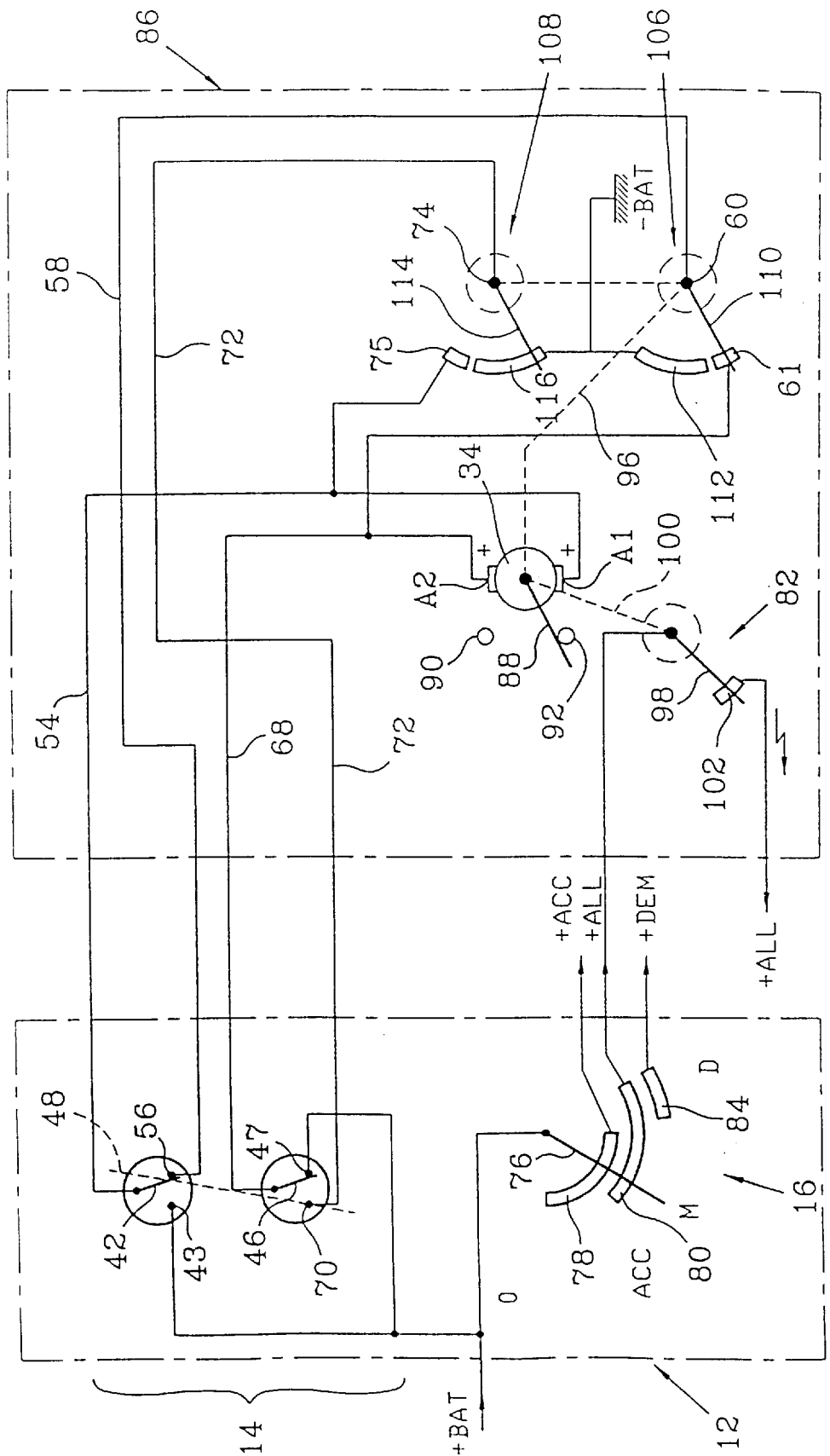
FIG. 11 is a diagram similar to FIG. 10, showing the electrical antitheft system in the unlocked state.
Figure 12:
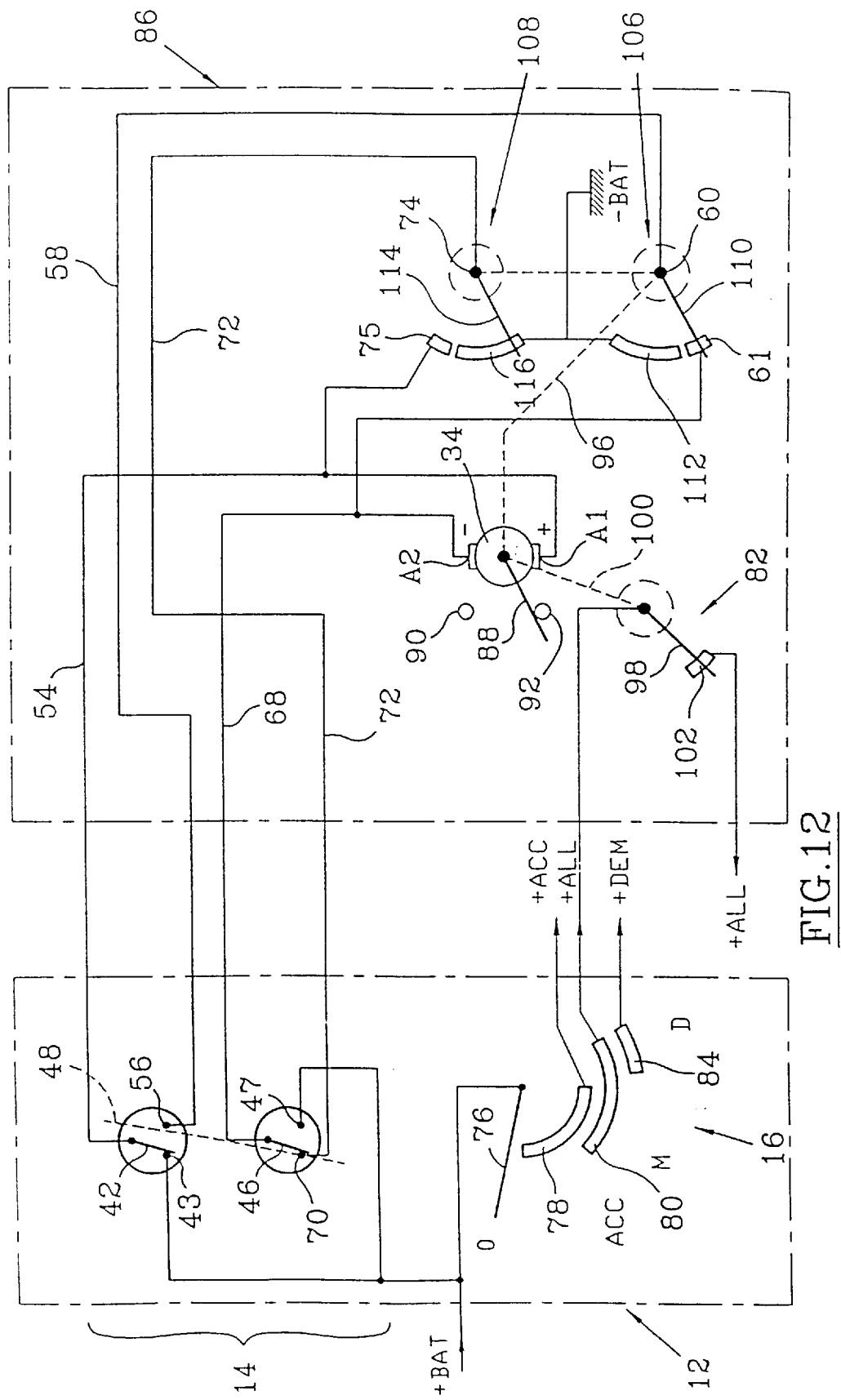
FIG. 12 is a diagram similar to that in FIG. 11, showing the electrical antitheft system still in the unlocked state, but after withdrawal of a key has been simulated.
Figure 13:
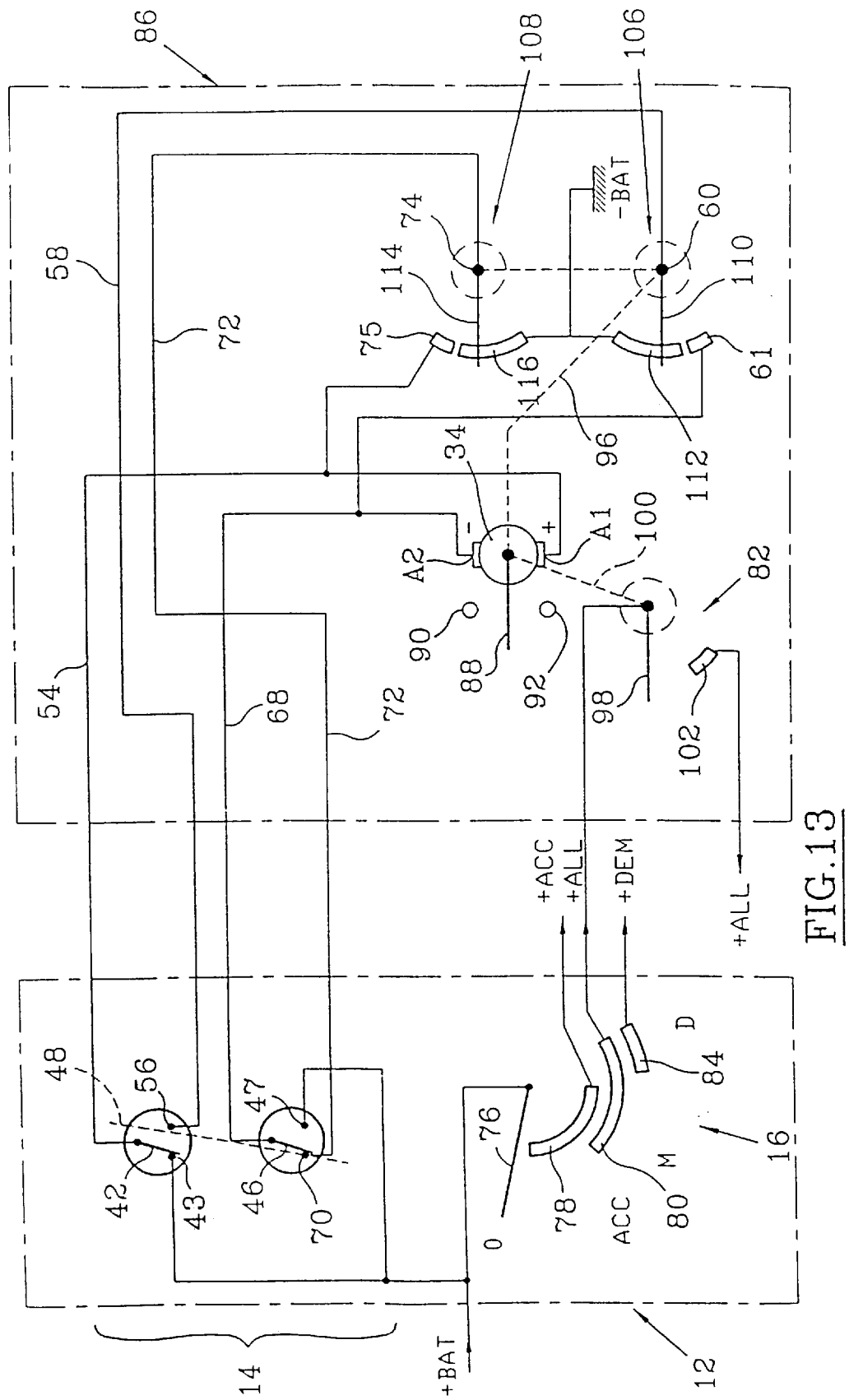
FIG. 13 is a diagram similar to that in FIG. 12, in which the antitheft system is passing from the unlocked state to the locked state.

If the driver continues to rotate the movable contact 76 into contact with the conductive strip 80, the ignition circuit +ALL is not supplied with any power because the movable contact 98 of the inhibiting device is in its rest position, in which it interrupts the power supply to the circuit +ALL. By contrast, once the motor 34 reaches its unlocking position, which is shown in FIG. 11, the movable contact 98 of the inhibiting device is now in contact with its fixed contact pad 102, so that the ignition circuit +ALL is now connected to the conductive strip 80 of the multiple position control interrupter 16.

Thus, if the driver puts the movable control contact 76 into the running position M, the ignition circuit +ALL is now energised; and if he puts it into the starting position D, the ignition circuit +ALL and the starter circuit +DEM are now both simultaneously supplied with power. The internal combustion engine of the vehicle can now be started in the certainty that the antitheft system has already been unlocked (disarmed).

Once the motor has started, the movable control contact 76 remains in its running position M, corresponding to the running condition of the engine.

In the various embodiments described above, the polarities of the battery, +BAT and −BAT, may be reversed while retaining the same method of operation. Where these polarities are reversed, the motor 34 is in short circuit at the potential −BAT in the locked or unlocked position, which adds further security of operation to the system, since any accidental grounding of an element of the antitheft system is then unable to give rise to unwanted locking of the system.

What is claimed is:

1. An electrical antitheft system, for a motor vehicle having: an engine, an electric starter for starting the engine; a power supply source defining a first polarity and a second polarity; a plurality of electrical means; and a plurality of electrical power supply circuits for the electrical means, the antitheft system comprising: an antitheft switch for controlling starting and running of the engine and selectively the independent and combined activation of the power supply to the plurality of circuits and the running of the engine; and a motorized antitheft device having a blocking member defining two positions thereof corresponding to a locked state and an unlocked state of the antitheft system, respectively, and an electric motor having an output shaft, a first power supply terminal and a second power supply terminal, the output shaft of the motor coupled to said blocking member for actuation of said blocking member between said positions by inversion of the polarities at said terminals of the motor, the antitheft switch having: a key interrupter for detecting simulated introduction of a key into the antitheft switch, and a multiple position control interrupter for sequentially controlling the supply of power to the plurality of power supply circuits and to the starter, said control interrupter having a movable control contact coupled to one said polarity of the power supply source, together with a set of fixed contacts for successive contact with said movable control contact when the antitheft switch is operated for starting the vehicle, wherein the motorized antitheft device further includes detecting means for detection of the state of the antitheft system, the detecting means being arranged so that:

said first motor terminal is coupled through the key interrupter to the first polarity in the absence of said key and to the second polarity in the presence of said key, and through said detecting means when the antitheft system is in a state other than its unlocked state; and said second motor terminal is coupled to the first polarity through the key interrupter in the presence of said key, and through said detection means in the absence of said key when the system is in its locked state;

said second motor terminal is coupled to said second polarity through the key interrupter in the absence of said key and through said detection means when the antitheft unit is in a state other than its locked state.

2. A system according to claim 1, wherein the key interrupter comprises a first switch and a second switch having a first movable contact and a second movable contact respectively, said movable contacts being ganged together for simultaneous movement between a first position and a second position corresponding to the absence and presence of said key respectively, said first and second switches each having a respective fixed contact permanently connected to the first polarity of the power supply source, the detecting means having a first output terminal and a second output terminal, said first and second movable contacts of the key interrupter coupled to the first and second power supply terminals of the motor, respectively, the system being such that:

said first movable contact cooperates with said fixed contact of the first switch in the absence of said key, and, in the presence of said key, cooperates with said first output terminal;

said first output terminal is coupled to said second polarity of the supply source when the system is in a state other than its unlocked state;

said second movable contact cooperates with said fixed contact of the second switch in the presence of said key and, in the absence of said key, cooperates with said second output terminal; and said second output terminal is connected to the second polarity of the supply source when the system is in a state other than its locked state.

3. A system according to claim 2, wherein said detecting means comprise a first interrupter and a second interrupter, for detection of the unlocked and locked states, respectively, of the system, said first interrupter having a third movable contact connected to said first output terminal, a first fixed contact of the first interrupter connected to the second polarity of the supply source, and a second fixed contact of the first interrupter connected to said second motor terminal, said second interrupter having a fourth movable contact connected to said second output terminal, a first fixed contact of the second interrupter connected to the second polarity of the supply source, and a second fixed contact of the second interrupter connected to said first motor terminal, the detecting means being arranged so that the third movable contact cooperates with the first fixed contact of the first interrupter when the system is in a state other than its unlocked state, and with the second fixed contact of the first interrupter when the system is in its unlocked state, and so that the fourth movable contact cooperates with the first fixed contact of the second interrupter when the system is in a state other than its unlocked state, and with the second fixed contact of the second interrupter when the system is in its locked state.

4. A system according to claim 3, wherein said first contacts of the first and second interrupters of the detecting means comprise conductive contact strips, and further including means coupling the output shaft of the motor with said third and fourth movable contacts.

5. A system according to claim 1, further including an inhibiting device coupled electrically between at least one of the electrical circuits of the vehicle and at least one of the fixed contacts of the multiple position control interrupter, whereby to permit power to be supplied to the at least one circuit in the plurality of circuits only when the system is in its unlocked state.

6. A system according to claim 5, wherein said inhibiting device comprises an inhibiting interrupter having a fixed contact and a movable contact such that the inhibiting interrupter is closed in the unlocked state of the system, one of said fixed and movable contacts of the inhibiting interrupter being connected to one of the supply source polarities, and the other being connectable by the control interrupter to said at least one fixed contact of the latter.

7. A system according to claim 6, including means coupling the movable contact of said inhibiting interrupter to the motor for rotation therewith.

8. A system according to claim 1, further including an inhibiting device connected between the movable contact of the multiple position control interrupter and one of the supply source polarities, whereby to make the electrical coupling between the control interrupter and the supply source only when the system is in its unlocked state.

9. A system according to claim 8, wherein the inhibiting device comprises an inhibiting interrupter having a movable contact and a fixed contact, the movable contact of the inhibiting interrupter coupled to one of the supply source polarities, and its fixed contact being connected to the movable control contact of the control interrupter, with the inhibiting device being arranged for cooperation between its contacts when the system is in its unlocked state.

10. A system according to claim 1, wherein the antitheft switch is a rotary switch.

* * * * *